US010288899B2

(12) United States Patent
Ernica (10) Patent No.: US 10,288,899 B2
(45) Date of Patent: May 14, 2019

(54) SYSTEM FOR SECURING EYEWEAR TO A USER OR OBJECT

(71) Applicant: J'S & J'S LLC, Miami, FL (US)

(72) Inventor: Jeysmar James Ernica, Sunny Isles Beach, FL (US)

( * ) Notice: Subject to any disclaimer, the term of this patent is extended or adjusted under 35 U.S.C. 154(b) by 0 days.

(21) Appl. No.: 15/982,098

(22) Filed: May 17, 2018

(65) Prior Publication Data
US 2018/0335641 A1 Nov. 22, 2018

Related U.S. Application Data

(60) Provisional application No. 62/507,778, filed on May 17, 2017.

(51) Int. Cl.
*G02C 3/04* (2006.01)
*G02C 9/04* (2006.01)
*G02C 5/14* (2006.01)

(52) U.S. Cl.
CPC ............ *G02C 3/04* (2013.01); *G02C 5/146* (2013.01); *G02C 9/04* (2013.01); *G02C 2200/02* (2013.01)

(58) Field of Classification Search
CPC ... G02C 3/00; G02C 3/04; G02C 9/04; G02C 2200/02
USPC .................................................. 351/111, 112
See application file for complete search history.

(56) References Cited

U.S. PATENT DOCUMENTS

| 1,898,059 | A | * | 2/1933 | McDonald | G02C 3/04 24/11 F |
| 4,852,221 | A | * | 8/1989 | Antonucci | B43K 23/001 24/10 R |
| 4,976,531 | A | * | 12/1990 | Kahaney | G02C 3/003 351/156 |
| 5,406,340 | A | * | 4/1995 | Hoff | A61F 9/027 2/452 |
| 5,471,679 | A | * | 12/1995 | Paoluccio | A61F 9/02 2/9 |
| 5,488,441 | A | * | 1/1996 | Pomatti | G02C 3/003 2/452 |

(Continued)

FOREIGN PATENT DOCUMENTS

CN 101036079 A 9/2007

*Primary Examiner* — William R Alexander
(74) *Attorney, Agent, or Firm* — Rafael Perez-Pineiro, Esq.; The Brickell IP Group, PLLC (57) ABSTRACT

The system disclosed herein generally discloses a system for securing eyewear to a user or object. The system comprises an eyewear frame having a first temple and a second temple, wherein each temple is pivotally connected to the eyewear frame at a hinge. The system further discloses a first sleeve and second sleeve each having an external side, an internal side, an anterior end, a posterior end, and an insertion chamber extending between the external and internal sides of the sleeve and also extending through the anterior and posterior ends of the sleeve. Each sleeve is positioned along the length of the temple by positioning the temple through the insertion chamber of the sleeve. The system further discloses a first magnetized element secured to the external side of the first sleeve of the disclosed system, and a second magnetized element secured to the internal side of the second sleeve of the disclosed system. The magnetized elements are magnetically secured to one another when the eyewear's respective temples are pivoted into a closed folded position.

22 Claims, 8 Drawing Sheets

(56) References Cited

U.S. PATENT DOCUMENTS

| | | | | |
|---|---|---|---|---|
| 5,655,264 A * | 8/1997 | Davancens | | G02C 3/003 24/3.1 |
| 6,007,198 A * | 12/1999 | Burton | | G02C 9/02 351/41 |
| 6,092,897 A * | 7/2000 | Smerdon, Jr. | | G02C 11/00 351/156 |
| 6,450,640 B1 * | 9/2002 | Van Rysselberghe | | G02C 3/003 351/123 |
| 6,817,069 B1 * | 11/2004 | Tillstrom | | A45F 5/00 24/298 |
| 6,848,787 B2 | 2/2005 | Dietz | | |
| D519,542 S * | 4/2006 | Goodman | | 351/157 |
| 7,172,283 B1 | 2/2007 | Asta | | |
| 7,229,171 B2 | 6/2007 | Dietz | | |
| 2002/0133914 A1 * | 9/2002 | Scott | | G02C 3/003 24/3.3 |
| 2003/0098949 A1 * | 5/2003 | Dietz | | G02C 3/04 351/112 |
| 2004/0125333 A1 * | 7/2004 | Dietz | | G02C 3/04 351/41 |
| 2006/0055869 A1 * | 3/2006 | Dietz | | G02C 3/04 351/47 |
| 2007/0006425 A1 * | 1/2007 | Woodbury | | A45C 11/04 24/3.3 |
| 2008/0062377 A1 * | 3/2008 | Weidler | | G02C 5/00 351/43 |
| 2010/0283960 A1 * | 11/2010 | Berdou | | G02C 3/003 351/156 |
| 2011/0043749 A1 * | 2/2011 | Alley | | G02C 11/00 351/111 |
| 2012/0026454 A1 * | 2/2012 | Wu | | A61F 11/12 351/158 |
| 2012/0096628 A1 * | 4/2012 | Grady | | A41D 27/204 2/249 |
| 2012/0105797 A1 * | 5/2012 | Howard | | G02C 11/00 351/158 |
| 2014/0022504 A1 * | 1/2014 | Peterson | | G02C 3/00 351/155 |
| 2014/0063443 A1 * | 3/2014 | Berger | | A42B 1/247 351/155 |
| 2016/0306188 A1 * | 10/2016 | Head | | G02C 3/04 |
| 2016/0345716 A1 * | 12/2016 | Head | | A45F 5/02 |
| 2017/0020454 A1 * | 1/2017 | Keteyian | | A61B 5/6803 |
| 2017/0315385 A1 * | 11/2017 | Chung | | F21V 21/0885 |
| 2018/0125214 A1 * | 5/2018 | Daly | | A45F 5/02 |
| 2018/0129067 A1 * | 5/2018 | Boedecker | | G02C 5/006 |

* cited by examiner

SYSTEM FOR SECURING EYEWEAR TO A USER OR OBJECT

CROSS-REFERENCE TO RELATED APPLICATIONS

This application claims the benefit of U.S. Provisional Application No. 62/507,778, filed May 17, 2017.

FIELD OF THE INVENTION

Embodiments of the present invention generally relate to a system that magnetically secures the respective eyewear temples to one another as well as to a user or an external object.

BACKGROUND

Eyewear, such as reading glasses or sunglasses, are generally comprised of a frame having two respective lenses situated on opposing sides of a nose piece. The frame further comprises two temples extending away from the frame and lenses. Each of these temples are pivotally connected to the frame by a hinge which allows each temple to pivot between an open position wherein each temple is perpendicularly situated with reference to the frame, and a folded position wherein each temple is positioned in parallel with reference to the frame. The temples and nose piece support the frame and lenses on the head of the user when the temples are pivoted in an open position.

It is common for the user to consistently and temporarily remove their eyewear and pivot the temples into a closed folded position. The temporary removal of eyewear from the user's head is often accompanied by several drawbacks, including loss of the eyewear when the user fails to recall where the eyewear was temporarily placed; uncomfortable bouncing against the user's chest when the eyewear is folded against the neckline of the user's clothing or when the eyewear is hung around the user's neck with a lanyard or similar device; or damage to the eyewear when the eyewear is placed in the user's pocket or the when the eyewear falls from the user's neckline.

It is therefore desirable to integrate a device to the temple of the eyewear that secures the temples to one another, and preferably to other objects. Several prior art designs involve modification of the temple, an unsecured magnetic element that spins around the axis of the eyewear's temple, or permanent attachment of a device to the temple through the manufacture of the eyewear's temple. However, these prior art designs are cumbersome to mount, substantially alter the appearance of the eyewear, involve changes to the manufacturing specifications, or are only compatible with a very limited variety of temple sizes and designs.

For example, U.S. Pat. No. 6,848,787 to Dietz, discloses a clasp for maintaining eyeglasses on clothing material by magnetic means. The magnetic clasps disclosed in Dietz, however, are only compatible with a specific wire temple design and temple diameter, and in some embodiments, require modification of the temple to accommodate the clasp. Moreover, the magnetized side of the clasp disclosed in Dietz is not secured to an external or internal side of the temple, thereby causing the magnetized side to freely rotate around the axis of the temple.

U.S. Pat. No. 7,172,283 to Asta, discloses a magnet attached to a pair of hinge rings that can be secured to the temples of eyeglasses that enables the user to affix the eyeglasses to articles of clothing worn by the user. The device disclosed by Asta, however, has a cumbersome appearance that does not blend with the aesthetic appearance of the temple to which the device is secured. Also, like Dietz, the magnet disclosed in Asta is also not secured to an external or internal side of the temple, thereby causing the magnet to freely rotate around the axis of the temple.

Therefore, in view of these disadvantages, there is a need in the art for an improved, system for securing eyewear to the user and other objects when the eyewear is not in use.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

The system disclosed herein generally discloses a system for securing eyewear to a user or object. The system comprises an eyewear frame having a first temple and a second temple, wherein each temple is pivotally connected to the eyewear frame at a hinge.

The system further discloses a first sleeve and second sleeve each having an external side, an internal side, an anterior end, a posterior end, and an insertion chamber extending between the external and internal sides of the sleeve and also extending through the anterior and posterior ends of the sleeve. Each sleeve is positioned along the length of the temple by positioning the temple through the insertion chamber of the sleeve.

The system further discloses a first magnetized element secured to the external side of the first sleeve of the disclosed system, and a second magnetized element secured to the internal side of the second sleeve of the disclosed system. The magnetized elements are magnetically secured to one another when the eyewear's respective temples are pivoted into a closed folded position.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

Figures 1A, 1B:
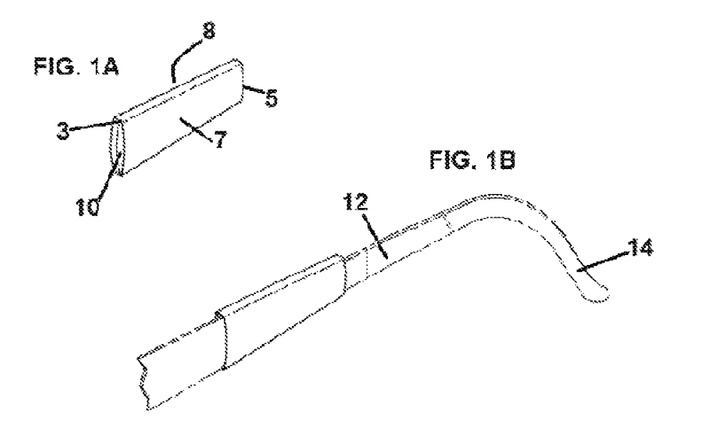
FIG. 1A illustrates the external side of the sleeve of the system disclosed herein.
FIG. 1B illustrates the sleeve depicted in FIG. 1A secured to the eyewear's temple.

As illustrated in FIG. 1A, in one embodiment the system discloses a sleeve 1 having an anterior end 3, a posterior end 5, an exterior side 7, and an interior side 8 (not shown). Sleeve 1 further comprises an insertion chamber 10 extending from the anterior end 3 to the posterior end 5 of the sleeve 1. As illustrated in FIG. 1B, sleeve 1 extends over a section of an eyewear temple 12 having temple tip 14.

Preferably, sleeve 1 is colored or dyed with any color, pattern, texture, or finish that either resembles the color, pattern, texture, or finish of the eyewear temple, or alternatively, matches the preference of the user. Alternatively, exterior side 7 of sleeve 1 further comprises a trademark, logo, symbol, or other similar identifying mark. Because temple 12 can be comprised of any variety materials suitable for eyewear (including but not limited to polycarbonate, metal, acetate, or wood), or any variety of shapes and styles, it is preferable that sleeve 1 made of an elastic or flexible material, including but not limited to a rubber-based or silicone-based compound. Preferably, sleeve 1 is comprised of a texturized material on the interior 8 side of the sleeve that assists in gripping the sleeve to the user's head. In one embodiment, this texturized material can be in the form of a plurality of raised nodules or lines.

As further illustrated in FIG. 1A, sleeve 1 is positioned on the temple by inserting temple tip 14 into insertion chamber 10 at the anterior end 3 of the sleeve 1. Sleeve 1 is the slid along the length of the temple until insertion chamber 10 fits snugly around the eyewear's temple at both the anterior end 3 and posterior end 5 of the sleeve 1.

Figure 2A:
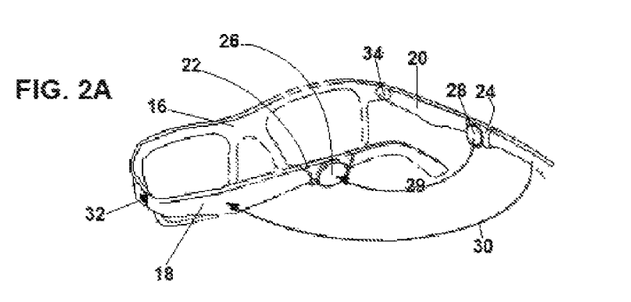
FIG. 2A illustrates the system disclosed herein with one temple in the open position and a second temple in a closed folded position.

As illustrated in FIG. 2A, in one embodiment the system discloses eyewear having two respective temples 18, 20. Each temple 18, 20 further comprises a sleeve 22, 24 positioned along the length of each temple. Sleeves 22, 24 further comprise first and second magnetized elements 26, 28 respectively placed within the sleeve. Magnet 26 is positioned on the exterior side of sleeve 22, and magnet 28 is positioned on the interior side of sleeve 24.

Figure 2B:
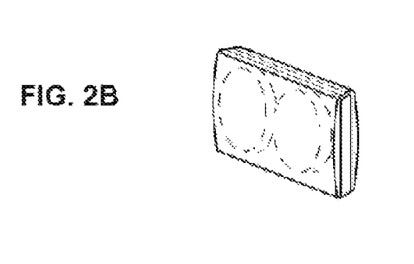
FIG. 2B illustrates an embodiment of the sleeve of the disclosed system wherein a plurality of magnets is enveloped within the sleeve material.

As illustrated in FIG. 2B, the magnet is embedded within an interior or exterior side of the sleeve. As further illustrated in FIG. 2B, the sleeve of the system discloses an alternative embodiment wherein a plurality of magnets is placed within the wall of the sleeve.

First and second magnetized elements 26, 28 are preferably comprised, of an iron, steel, or alloy material each having the property of producing a magnetic field external to itself. The magnetic field produced by first and second magnetized elements 26, 28 is preferably strong enough to attract the magnets towards one another when the magnets are positioned less than one inch from one another. Preferably, the strength of the magnetic field should not impede or prohibit a user from using a nominal amount of force for separating first and second magnetized elements 26, 28 after they have been placed in contact with one another. The magnets may also contain certain therapeutic qualities for the user, such as increased blood flow, pain alleviation, and muscle relaxation.

As further illustrated in FIG. 2A, first and second magnetized elements 26, 28 are attracted to one another when temples 18, 20 are folded at hinges 32, 34, as shown in the direction of lines 29, 30. Preferably, sleeves 22, 24 are positioned on the same location of the respective temples 18, 20 so that first and second magnetized elements 26, 28 come in to contact with one another when temples 18, 20 are folded at hinges 32, 34 into a final folded position. In alternative embodiment, as depicted in FIG. 3C, each of sleeves 22, 24 comprise third and fourth magnetized elements 25, 27 on their interior and exterior sides so that the magnets will attract and secure their respective temples regardless of which temple is first folded into a closed position.

Figure 3A:
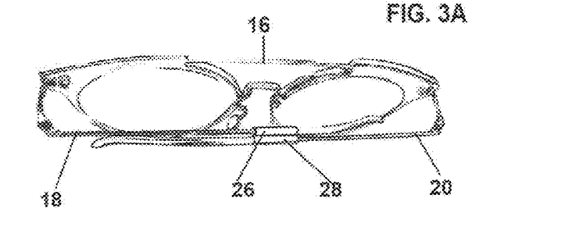
FIG. 3A illustrates the disclosed system with both temples in the closed folded position.
Figure 3B:
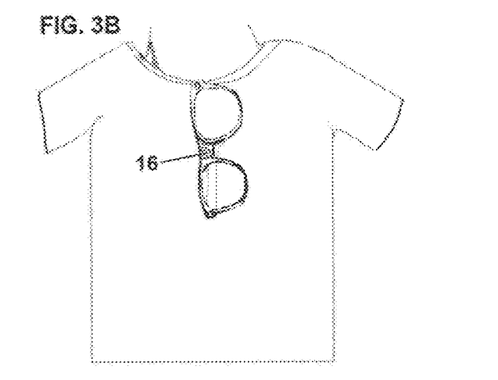
FIG. 3B illustrates the eyewear secured to a user's clothing in the closed folded position.

In FIG. 3A, the system discloses first and second magnetized elements 26, 28 secured to one another, and temples 18, 20 secured in a final folded position. Once first and second magnetized elements 26, 28 secure temples 18, 20 in this folded position, eyewear 16 can be secured to a variety of objects. For example, as illustrated in FIG. 3B, eyewear 16 can be secured to the neckline of the user's clothing.

Figure 3C:
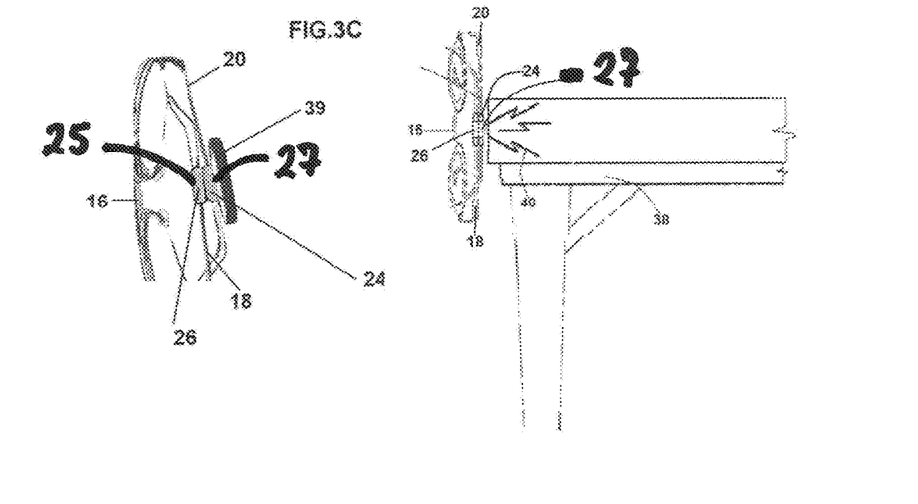
FIG. 3C illustrates the eyewear secured to an external object in the closed folded position.

In an alternative embodiment, as illustrated in FIG. 3C, exterior side of sleeve 24 further comprises fourth magnetized element 27. In this embodiment, when temples 18, 20 are secured in a folded position, eyewear 16 can be secured to are object (for example, table 38) that is attracted to the magnetic field 40 generated by fourth magnetized element 27. In an alternative embodiment, the system further comprises a magnetic pad accessory 39. The pad accessory 39 disclosed by the system comprises an adhesive surface that can engage to an object such as, for example, table 38 depicted in FIG. 3C. The pad accessory 39 further comprises a magnetic surface that can engage a compatible magnetic material such as, for example, fourth magnetized element 27.

Figure 4A:
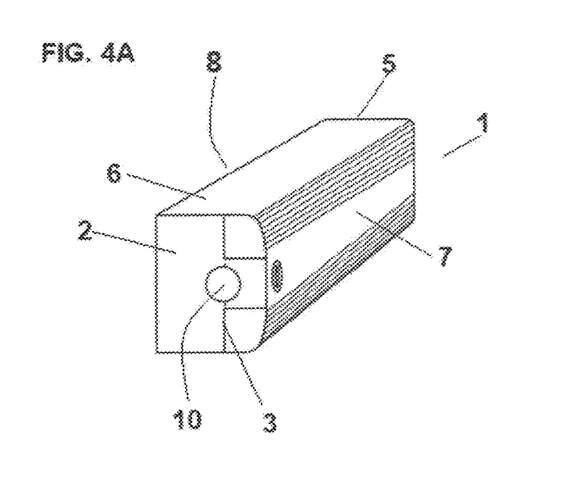
FIG. 4A illustrates a side perspective view of an alternative embodiment of the sleeve of the disclosed system having a locking chamber.

FIG. 4A illustrates an alternative embodiment of the system disclosing sleeve 1 comprised of a magnet 2 enveloped by a flexible outer casing 6 having an anterior end 3, posterior end 5, external side 7 and internal side 8 (not shown). In this embodiment, insertion chamber 10 is formed throughout the interior length of sleeve 1 and extends from the anterior end 3 to the posterior end 5 of the sleeve.

Figure 4B:
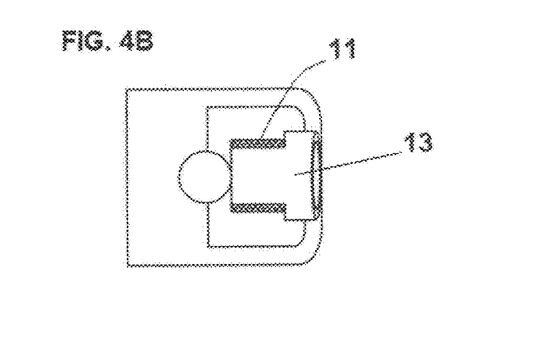
FIG. 4B illustrates a cross-sectional view of the locking chamber and locking screw elements of the sleeve depicted in FIG. 4A.

As further illustrated by FIG. 4B, in this embodiment the system discloses the sleeve further comprising a locking chamber 11 that accepts a corresponding locking screw 13. Preferably, locking chamber 11 and locking screw are correspondingly threaded as male and female counterparts. In this embodiment, as illustrated by FIG. 4B, locking screw 13 is threaded into locking chamber 11 until the leading end of locking screw contacts the surface of a temple extending through insertion chamber 10. Locking screw 13 is preferably tightened against the surface of the temple until sleeve 1 is securely tightened against the temple.

Figure 4C:
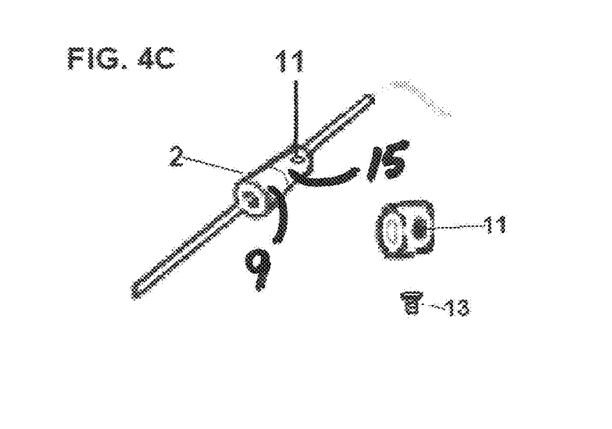
FIG. 4C illustrates an alternative embodiment of the sleeve depicted in FIG. 4A.

FIG. 4C illustrates another embodiment of the locking chamber 11 and locking screw 13 wherein the locking chamber and screw are directly incorporated into a posterior and anterior ring, 9 and 15 and the magnetic element is disposed and secured attached to one or between said rings.

Figure 5A:
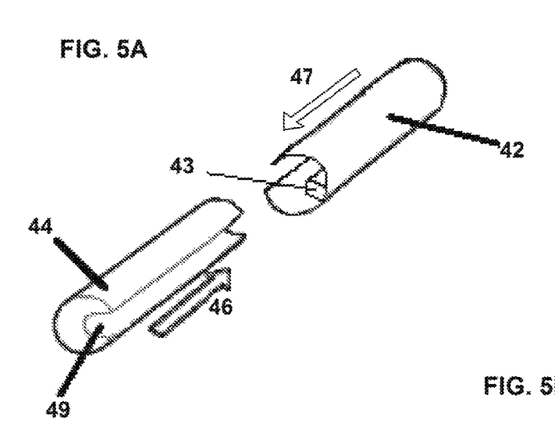
FIG. 5A illustrates an alternative embodiment of the sleeve of the disclosed system having an inner magnetized element that traverses the entire length of the sleeve.
Figure 5B:
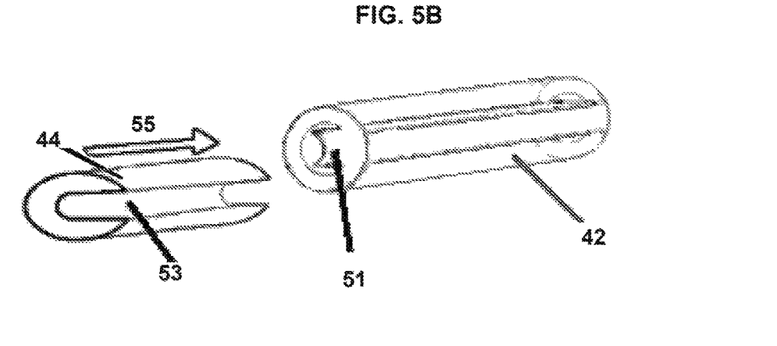
FIG. 5B illustrates an alternative embodiment of the sleeve depicted in FIG. 5A wherein the sleeve is further comprised of a lateral slot for attaching to the temple without removing the temple tip.
Figure 5C:
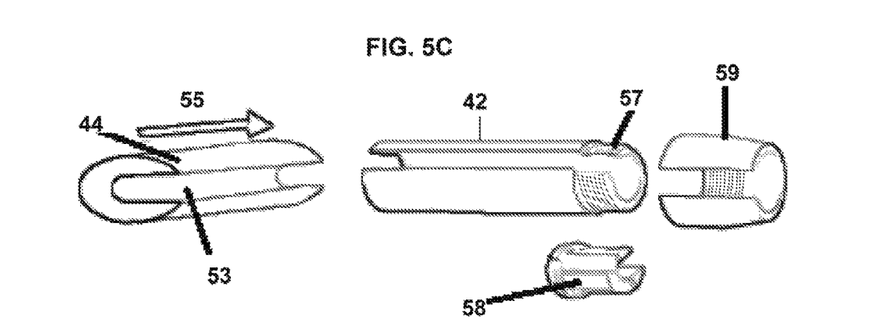
FIG. 5C illustrates the sleeve depicted in FIGS. 5A and 5B, further comprising a threaded anterior end that is compatible with a threaded cap to further secure the sleeve to the temple.

FIGS. 5A through 5C disclose an alternative embodiment of the sleeve of the disclosed system. As illustrated in FIG. 5A, in one embodiment the sleeve comprises an outer sleeve portion 42. In the embodiment depicted by FIG. 5A, the outer sleeve portion has a cylindrical shape that preferably engages to a round wire or metal temple. The outer sleeve portion, however, can be of any length or shape to seamlessly engage with a specific temple design. Preferably, the outer sleeve depicted in FIG. 5A is comprised of a hard or rigid material. As further depicted in FIG. 5A, the system disclosed by this embodiment further comprises an inner magnetic portion 44 that engages the outer sleeve portion 42 by sliding the inner magnetic portion into the outer sleeve portion in the direction of arrows 46, 47 until the entire length of inner magnetic portion is enveloped by outer sleeve portion. Inner magnetic portion 44 further comprises a chamber 49 for receiving a temple and a securing strip 45 for further securing the temple to the outer sleeve.

FIG. 5B further illustrates an alternative embodiment of the disclosed system. In this embodiment, outer sleeve portion 42 further comprises outer lateral slot 51, and inner magnetic portion 44 further comprises inner lateral slot 53. When inner magnetic portion engages outer sleeve portion by sliding inner magnetic portion into the outer sleeve portion in the direction of arrow 55, outer lateral slot and inner lateral slot will be aligned, thus allowing the user to snap the sleeve onto a preferred location along the length of the temple without requiring insertion of the sleeve through the terminal end of the temple, which often necessitates removal of the temple tip.

FIG. 5C depicts an alternative embodiment of the outer sleeve depicted in FIG. 5A further comprising a threaded male segment 57 located at either the posterior end or anterior end of the outer sleeve. As further depicted in FIG. 5C, this embodiment further comprises an inner shell 58 preferably comprised of a flexible silicon-based material, and internally threaded cap 59 that engages to the threaded end of the sleeve thereby further securing the sleeve to the temple. In this embodiment the inner shell 58 directly engages the temple and the outer sleeve and cap are fitted over the internal shell be aligning their respective slots through the temple and securing the cap on to the threaded male segment of the outer sleeve to secure inner shell into the temple.

Figure 6A:
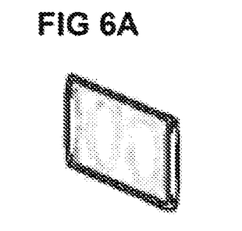
FIG. 6A illustrates a sleeve of the disclosed system having one insertion chamber.
Figure 6B:
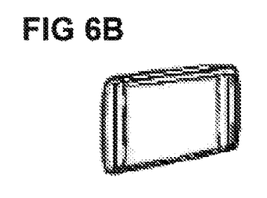
FIG. 6B illustrates a sleeve of the disclosed system having two insertion chambers.
Figure 6C:
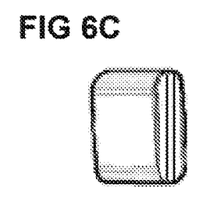
FIG. 6C illustrates a sleeve of the disclosed system having three insertion chambers.
Figure 6D:
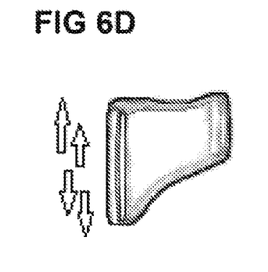
FIG. 6D illustrates a sleeve of the disclosed system having a flared, flexible anterior end.

In FIGS. 6A through 6C, the system discloses an alternative embodiment whereby multiple insertion chambers are provided on the sleeve. FIG. 6A illustrates an embodiment similar to the sleeve shown in FIGS. 1A and 2B wherein the sleeve comprises a single insertion chamber for receiving the eyewear temple. As illustrated in FIG. 6B, in another embodiment, the sleeve comprises two separate chambers: a first chamber for receiving the temple, and a second chamber for receiving magnetized elements for securing the eyewear's respective temples to one another and to other objects in accordance with the invention disclosed herein. In yet another alternative embodiment, as illustrated in FIG. 6C, the sleeve comprises three separate chambers: a middle chamber for receiving the temple, and an interior and exterior chamber for receiving magnetized elements. FIG. 6D further illustrates the sleeve disclosed herein having a flared anterior end, thereby demonstrating the flexibility of the sleeve and applicability to a variety of temple designs. In addition to magnetic elements, the chambers can also be fitted with a small chip having global position system (GPS) capabilities to monitor the whereabouts of the eyewear's user, or wireless of Bluetooth capabilities for communicating with the user's smartphone or music library.

Figure 7A:
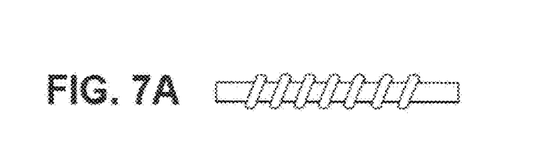
FIG. 7A illustrates an embodiment of the sleeve of the disclosed system whereby a magnetized semi-rigid wire is wrapped around the length of the temple.
Figures 7B, 7C, 7D:
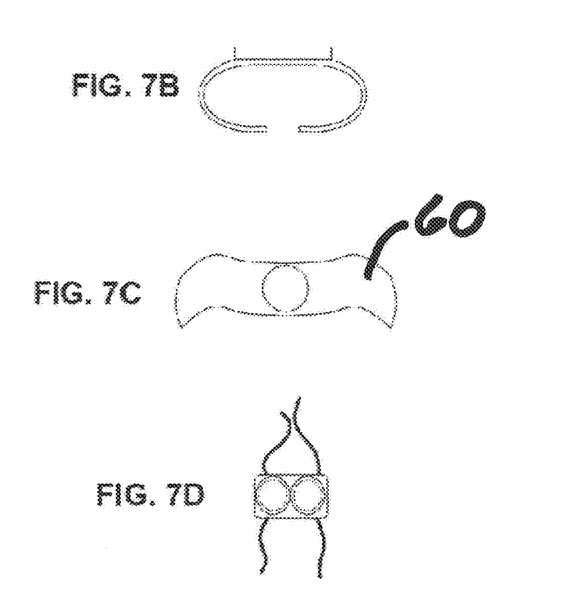
FIG. 7B illustrates an embodiment of the sleeve of the disclosed system whereby a semi-rigid clip having a magnetized side and two flexible prongs.
FIG. 7C illustrates an embodiment of the sleeve of the disclosed system wherein the ends of the sleeve engage one another with hook and loop fasteners.
FIG. 7D illustrates an embodiment of the sleeve of the disclosed system whereby the sleeve is secured to the temple with string ties.
Figure 7E:
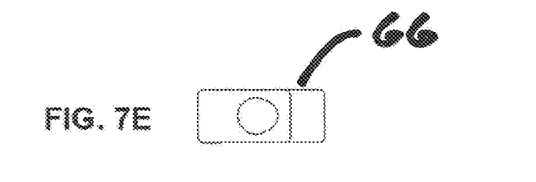
FIG. 7E illustrates an embodiment of the sleeve of the disclosed system whereby the sleeve further comprises a buckle.
Figure 7F:
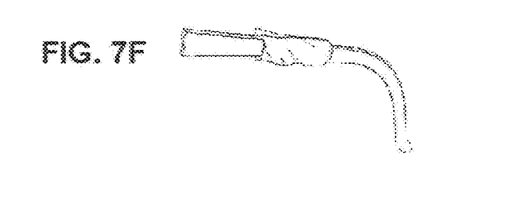
FIG. 7F illustrates an embodiment of the sleeve of the disclosed system whereby the sleeve is comprised of an adhesive tape that secures a magnet to the temple on its interior surface.
Figure 7G:
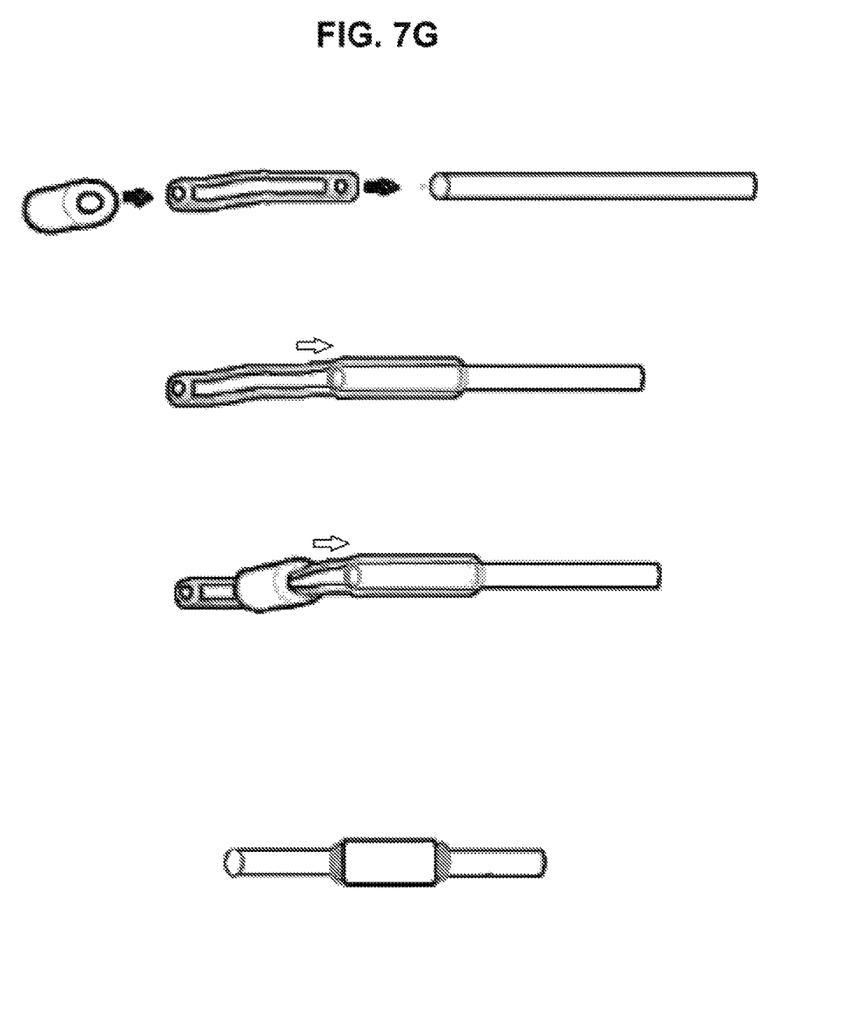
FIG. 7G illustrates an embodiment wherein the sleeve is compressed over the exterior of the temple.

FIGS. 7A through 7G illustrate several alternative embodiments for securing the magnetic elements of the system disclosed herein to the temple of as user's eyewear. FIG. 7A illustrates are embodiment whereby a magnetized semi-rigid wire is wrapped around the length of the temple. FIG. 7B illustrates an embodiment whereby a semi-rigid clip having a magnetized side and two flexible prongs for engaging temples of various dimensions and sizes. FIG. 7C illustrates an embodiment wherein the ends of the sleeve engage one another with hook and loop fasteners 60 thereby securing the sleeve to the temple. FIG. 7D illustrates an embodiment whereby the sleeve is secured to the temple with string ties. FIG. 7E illustrates an embodiment whereby the sleeve further comprises a buckle 66 or similar connecting mechanism that secures the ends of the sleeve to another and to the length of the eyewear temple. FIG. 7F illustrates an embodiment of the sleeve of the disclosed system whereby the sleeve is comprised of an adhesive tape that secures a magnet to the temple on its interior surface. FIG. 7G illustrates an embodiment of the sleeve of the disclosed system whereby the sleeve is first fitted over the temple and the magnetic element is then fitted over the sleeve. The flexible material of the sleeve compresses against the magnetic element thereby securing the magnetic to the temple.

Figure 8A:
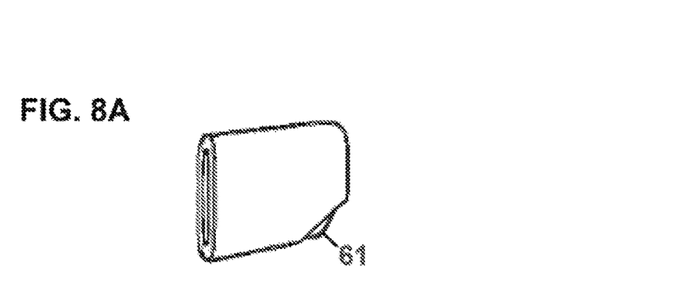
FIG. 8A illustrates an alternative embodiment of the sleeve of the disclosed system further comprising a hook for engaging a lanyard or similar device.
Figure 8B:
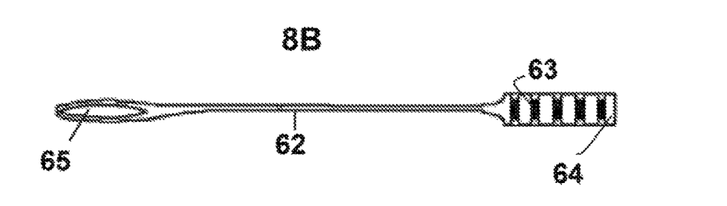
FIG. 8B illustrates a lanyard in an unstretched position for attaching to the sleeve illustrated in FIG. 8A.
Figure 8C:
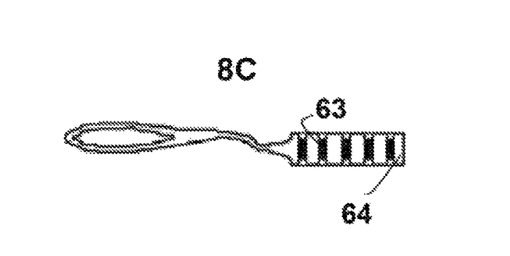
FIG. 8C illustrates a lanyard in a stretched position for attaching to the sleeve illustrated in FIG. 5A.

FIG. 8A discloses another embodiment of the sleeve of the disclosed system wherein the sleeve further comprises a hook 61 attached to the posterior end of the sleeve. The hook is shaped to permit a lanyard or similar device to be attached to the hook and around the user's head to further secure the eyewear to the user. FIG. 8B discloses another embodiment of the system disclosed herein wherein an extendable lanyard 62 is further provided having a magnet end 63, grip secure system 64 and a loop 65 for engaging the hook 61 depicted in FIG. 8A. In this embodiment a first and second extendable lanyard is attached to a first and second sleeve on first and second temples. The user can then engage the respective magnetic ends of the first and second lanyard to further secure the eyewear to the user's head. As illustrated in FIG. 8C, when the lanyard 62 is not in an extended position, the length of the lanyard is short enough so that the magnet end of the lanyard can engage to a magnetic element on the exterior side of the sleeve.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and structures described herein are intended to illustrate the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

As used herein, an element or step recited in the singular and proceeded with the word "a" or "an" should be understood as not excluding plural of said elements or steps, unless such exclusion is explicitly stated. Moreover, unless explicitly stated to the contrary, embodiments "comprising" or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. 112(f), unless and until such claim limitations expressly use the phrase "means for" followed by a statement of function void of further structure.

The invention claimed is:

1. A system for securing eyewear to a user or object comprising:
   an eyewear frame having a first temple and a second temple, said first and second temple each being pivotally connected to said frame at a hinge:
   a first and second sleeve each having an external side, an internal side, an anterior end, a posterior end, and an insertion chamber extending between said external and internal sides and extending through said anterior and posterior ends, wherein said first sleeve is positioned along the length of said first temple by positioning said first temple through the insertion chamber of said first sleeve, and wherein said second sleeve is positioned along the length of said second temple by positioning said second temple through the insertion chamber of said second sleeve;
   a first magnetized element secured to within said external side of said first sleeve;
   a second magnetized element secured within said internal side of said second sleeve, wherein said second magnetized element is attracted to and secured to said first magnetized element when said first and second temples are pivoted into a closed folded position;
   a third magnetized element secured within said internal side of said first sleeve, and a fourth magnetized element secured within said external side of said second sleeve; and
   a pad accessory having an adhesive side and a magnetized side, wherein said adhesive side can temporarily adhere to an external object and said magnetized side is magnetically attracted to and secures to said fourth magnetized element.

2. The system of claim 1 further comprising a plurality of first magnetized elements secured within said external side of said first sleeve, and a plurality of second magnetized elements secured within said internal side of said second sleeve.

3. The system of claim 1 wherein said first and second magnetized elements and said first and second sleeves further comprise a locking chamber traversing therethrough at an orientation perpendicular to said insertion chamber, and a corresponding locking screw, wherein said locking screw engages said locking chamber until the leading end of said locking screw contacts the surface of said first or second temple.

4. The system of claim 1 further comprising an anterior ring and a posterior ring each having a locking chamber traversing therethrough at an orientation perpendicular to said insertion chamber, and a corresponding locking screw, wherein said locking screw engages said locking chamber until the leading end of said locking screw contacts the surface of said first or second temple.

5. The system of claim 1 wherein said first and second sleeves further comprise a second insertion chamber for receiving a magnetized element or temple.

6. The system of claim 5 wherein said first and second sleeves further comprise a third insertion chamber for receiving a magnetized element or temple.

7. The system of claim 1 whereby said first and second sleeves are further secured to said first and second temples with a hook and loop fastener.

8. The system of claim 1 whereby said first and second sleeves are further secured to said first and second temples with a buckle.

9. The system of claim 1 whereby said first and second sleeves are further secured to said first and second temples with a string tie.

10. The system of claim 1 whereby said first and, second sleeves are further secured to said first and second temples with an adhesive on the internal sides of said first and second sleeves.

11. A system for securing eyewear to a user or object comprising:
an eyewear frame having a first temple and a second temple, said first and second temple each being pivotally connected to said frame at a hinge;
a first and second sleeve each having an external side, an internal side, an anterior end, a posterior end, and an insertion chamber extending between said external and internal sides and extending through said anterior and posterior ends, wherein said first sleeve is positioned along the length of said first temple by positioning said first temple through the insertion chamber of said first sleeve, and wherein said second sleeve is positioned along the length of said second temple by positioning said second temple through the insertion chamber of said second sleeve;
a first magnetized element secured to within said external side of said first sleeve;
a second magnetized element secured within said internal side of said second sleeve, wherein said second magnetized element is attracted to and secured to said first magnetized element when said first and second temples are pivoted into a closed folded position;
wherein said first magnetized element traverses said first sleeve from said anterior end to said posterior end of said first sleeve and said second magnetized element traverses said second sleeve from said anterior end to said posterior end of said second sleeve; and
wherein said anterior end of said first and second sleeve further comprises a threaded male segment, an internal shell, and an internally threaded cap, whereby said internal shell directly engages said first or second temple, said sleeve is fitted around said internal shell, and said internally threaded cap engages to said threaded male segment of said sleeve.

12. A system for securing eyewear to a user or object comprising:
an eyewear frame having a first temple and a second temple, said first and second temple each being pivotally connected to said frame at a hinge;
a first and second sleeve each having an external side, an internal side, an anterior end, a posterior end, and an insertion chamber extending between said external and internal sides and extending through said anterior and posterior ends, wherein said first sleeve is positioned along the length of said first temple by positioning said first temple through the insertion chamber of said first sleeve, and wherein said second sleeve is positioned along the length of said second temple by positioning said second temple through the insertion, chamber of said second sleeve;
a first magnetized element secured to within said external side of said first sleeve;
a second magnetized element secured within said internal side of said second sleeve, wherein said second magnetized element is attracted to and secured to said first magnetized element when said first and second temples are pivoted into a closed folded position;
wherein said first and second sleeves further comprise a hook located at the posterior end of said first and second sleeves, whereby said hook engages to a lanyard; and
wherein said lanyard is comprised of a magnetized end and a loop end, wherein said loop end engages to said hook and wherein said magnetized end further engages to the magnetized end of a second lanyard.

13. The system of claim 12 wherein said first and second magnetized elements further comprise an inner lateral slot and said first and second sleeves further comprise an outer lateral slot, and whereby said inner lateral slot and said outer lateral slot are aligned to receive said first or second temple.

14. The system of claim 12 wherein said magnetized end of said lanyard can engage to said fourth magnetized element.

15. The system of claim 12 further comprising a plurality of first magnetized elements secured within said external side of said first sleeve, and a plurality of second magnetized elements secured within said internal side of said second sleeve.

16. The system of claim 12 further comprising an anterior ring and a posterior ring each having a locking chamber traversing therethrough at an orientation perpendicular to said insertion chamber, and a corresponding locking screw, wherein said locking screw engage said locking chamber until the leading end of said locking screw contacts the surface of said first or second temple.

17. The system of claim 12 wherein said first and second sleeves further comprise a second insertion chamber for receiving a magnetized element or temple.

18. The system of claim 17 wherein said first and second sleeves further comprise a third insertion chamber for receiving a magnetized element or temple.

19. The system of claim 12 whereby said first and second sleeves are further secured, to said first, and second temples with a hook and loop fastener.

20. The system of claim 12 whereby said first and second sleeves are further secured to said first and second temples with a buckle.

21. The system of claim 12 whereby said first and second sleeves are further secured to said first and second temples with a string tie.

22. The system of claim 12 whereby said first and second sleeves are further secured to said first and second temples with an adhesive on the internal sides of said first and second sleeves.

* * * * *